United States Patent
Schoo et al.

(10) Patent No.: US 10,923,724 B2
(45) Date of Patent: Feb. 16, 2021

(54) DEVICE AND METHOD OF MANUFACTURING HIGH ASPECT RATIO STRUCTURES

(71) Applicant: Nederlandse Organisatie voor toegepast—natuurwetenschappelijk onderzoek TNO, 's-Gravenhage (NL)

(72) Inventors: Harmannus Franciscus Maria Schoo, 's-Gravenhage (NL); Sandeep Unnikrishnan, 's-Gravenhage (NL); Dorothee Christine Hermes, 's-Gravenhage (NL); Edsger Constant Pieter Smits, 's-Gravenhage (NL); Sami Sabik, 's-Gravenhage (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 33 days.

(21) Appl. No.: 15/571,740

(22) PCT Filed: May 3, 2016

(86) PCT No.: PCT/NL2016/050317
§ 371 (c)(1),
(2) Date: Nov. 3, 2017

(87) PCT Pub. No.: WO2016/178571
PCT Pub. Date: Nov. 10, 2016

(65) Prior Publication Data
US 2018/0159133 A1    Jun. 7, 2018

(30) Foreign Application Priority Data
May 4, 2015 (EP) .................................... 15166229

(51) Int. Cl.
*C23C 28/00* (2006.01)
*C23C 28/02* (2006.01)
(Continued)

(52) U.S. Cl.
CPC .............. *H01M 4/626* (2013.01); *B82Y 30/00* (2013.01); *H01G 9/209* (2013.01);
(Continued)

(58) Field of Classification Search
CPC ...... C23C 18/1653; C23C 28/00; C23C 28/02
(Continued)

(56) References Cited

U.S. PATENT DOCUMENTS

| | | |
|---|---|---|
| 2009/0214956 A1 | 8/2009 | Prieto et al. |
| 2010/0178564 A1* | 7/2010 | Asari ...................... H01G 9/016 429/231.8 |

(Continued)

FOREIGN PATENT DOCUMENTS

| | | |
|---|---|---|
| WO | 2008033827 A1 | 3/2008 |
| WO | 2009003150 A2 | 12/2008 |
| WO | 2010032159 A1 | 3/2010 |

OTHER PUBLICATIONS

Li et al., "Coating of Carbon Nanotube with Nickel by Electroless Plating Method," Jpn. J. Appl. Phys. (1997), vol. 36, pp. L501-503. (Year: 1997).*
(Continued)

*Primary Examiner* — Edna Wong
(74) *Attorney, Agent, or Firm* — Hoffmann & Baron, LLP (57) ABSTRACT

A method for manufacturing a electronic device is provided having a current collector capable of a high specific charge collecting area and power, but is also achieved using a simple and fast technique and resulting in a robust design that may be flexed and can be manufactured in large scale processing. To this end the electronic device comprising an
(Continued)

electronic circuit equipped with a current collector formed by a metal substrate having a face forming a high-aspect ratio structure of pillars having an interdistance larger than 600 nm. By forming the high-aspect structure in a metal substrate, new structures can be formed that are conformal to curvature of a macroform or that can be coiled or wound and have a robust design.

6 Claims, 7 Drawing Sheets

(51) Int. Cl.

| | |
|---|---|
| H01M 4/62 | (2006.01) |
| H01M 4/66 | (2006.01) |
| H01M 4/75 | (2006.01) |
| H01M 10/0562 | (2010.01) |
| H01M 10/0525 | (2010.01) |
| H01G 9/20 | (2006.01) |
| B82Y 30/00 | (2011.01) |
| H01M 10/04 | (2006.01) |
| H01M 4/02 | (2006.01) |

(52) U.S. Cl.
CPC .......... *H01G 9/2095* (2013.01); *H01M 4/661* (2013.01); *H01M 4/663* (2013.01); *H01M 4/667* (2013.01); *H01M 4/75* (2013.01); *H01M 10/0436* (2013.01); *H01M 10/0525* (2013.01); *H01M 10/0562* (2013.01); *H01M 2004/021* (2013.01); *H01M 2300/0065* (2013.01); *Y02E 10/542* (2013.01); *Y02E 60/10* (2013.01); *Y02P 70/50* (2015.11)

(58) Field of Classification Search
USPC ........ 205/205, 210, 183, 187, 188, 191, 198
See application file for complete search history.

(56) References Cited

U.S. PATENT DOCUMENTS

| | | | | |
|---|---|---|---|---|
| 2010/0261058 | A1* | 10/2010 | Lopatin | H01M 4/133 429/212 |
| 2010/0285372 | A1* | 11/2010 | Lee | H01M 6/185 429/320 |
| 2011/0117417 | A1 | 5/2011 | Pitts | |
| 2011/0183206 | A1 | 7/2011 | Davis et al. | |

OTHER PUBLICATIONS

Zhu et al., "Growth and Electrical Characterization of High-Aspect Ratio Carbon Nanotube Arrays," Carbon (2006), vol. 44, pp. 253-258. (Year: 2006).*
Gerasopoulos et al., "Hierarchical Three-Dimensional Microbattery Electrodes Combining Bottom-Up Self-Assembly and Top-Down Mircomachining," ACS Nano (2012), vol. 6, No. 7, pp. 6422-6432. (Year: 2012).*
Lattanzi et al., "Geometry-Induced Mechanical Properties of Carbon nanotube Foams," Advanced Engineering Materials (2014), vol. 15, No. 9999, pp. 1-6. (Year: 2014).*
Sun e al., "Preparation and Characterization of Polypyrrole Films for Three-Dimensional Micro Supercapacitor," Journal of Power Sources (2009), vol. 193, pp. 924-929. (Year: 2009).*
Lethien et al., Micro-Patterning of LiPON and lithium Iron Phosphate Material Deposited onto Silicon Nanopillars Array for Lithium Ion Solid State 3D Micro-Battery, Microelectronic Engineering (2011), vol. 88, pp. 3172-3177. (Year: 2011).*

Vereecken et al., "Conformal Deposition for 3D Thin-Film Batteries," ECS Transactions (2013), vol. 58, No. 10, pp. 111-118. (Year: 2013).*
Ren et al., "A Research on Stability of Sensitizing Solution for Electroless Plating," Diandu Yu Huanbao (2014), vol. 34, No. 3, pp. 31-33. (Year: 2014).*
Arthur et al., "Three-Dimensional Electrodes and Battery Architectures," MRS Bulletin (Jul. 2011), vol. 36, pp. 523-531. (Year: 2011).*
Golodnitsky et al., "Advanced Materials for the 3D Microbattery," Journal of Power Sources (2006), vol. 153, pp. 281-287. (Year: 2006).*
Oudenhoven et al., "All-Solid-State Lithium-Ion Microbatteries: A Review of Various Three-Dimensional Concepts," Adv. Energy Mater. (2011), vol. 1, pp. 10-33. (Year: 2011).*
Diasio, M., "Electrodeposition of Metals onto Aligned Carbon Nanotube Microstructures," NNIN Research Accomplishments, Jan. 1, 2011, pp. 190-191.
Arthur, T. et al., "Three-dimensional electrodes and battery architectures," MRS Bulletin, vol. 36, Jul. 1, 2011, pp. 525-530.
Li, Q. et al., "Coating of Carbon Nanotube with Nickel by Electroless Plating Method," Japanese Journal of Applied Physics, vol. 36, No. 4B, Part 02, Apr. 15, 1997, pp. L501-L503.
Osaka, Tetsuya, and Masahiro Yoshino. "New formation process of plating thin films on several substrates by means of self-assembled monolayer (SAM) process." Electrochimica Acta 53.2 (2007): 271-277.
Chen, Rizhi, et al. "Fabrication and catalytic properties of palladium nanoparticles deposited on a silanized asymmetric ceramic support." Industrial & Engineering Chemistry Research 50.8 (2011): 4405-4411.
Ang, Li-Ming, et al. "Electroless plating of metals onto carbon nanotubes activated by a single-step activation method." Chemistry of Materials 11.8 (1999): 2115-2118.
Peng, Ke, et al. "Room temperature functionalization of carbon nanotubes using an ozone/water vapor mixture." Carbon 49.1 (2011): 70-76.
Xu, Jiushuai, et al. "Comparative Study of Electroless Copper Film on Different Self-Assembled Monolayers Modified ABS Substrate." International journal of molecular sciences 15.4 (2014): 6412-6422.
Inoue, Fumihiro, et al. "Formation of electroless barrier and seed layers in a high aspect ratio through-Si vias using Au nanoparticle catalyst for all-wet Cu filling technology." Electrochimica Acta 56.17 (2011): 6245-6250.
Balasubramanian, Kannan, and Marko Burghard. "Chemically functionalized carbon nanotubes." Small 1.2 (2005): 180-192.
Felten, Alexandre, et al. "Radio-frequency plasma functionalization of carbon nanotubes surface O 2, NH 3, and CF 4 treatments." Journal of applied physics 981 (2005): 074308.
Hutchison et al., "High Aspect Ratio Microelectromechanical Systems: A Versatile Approach Using Carbon Nanotubes as a Framework", Transducers, pp. 1604-1607 (2009).
Sao et al., "Aligned Coaxial Nanowires of Carbon Nanotubes Sheathed with Conducting Polymers", Angew. Chem. Int. Ed.,39, No. 20, pp. 3664-3667 (2000).
Soldano et aL, "Carbon Nanotubes and Graphene Nanoribbons: Potentials for Nanoscale Electrical Interconnects", Electronics, 2, 280-314 (2013).
Fayazfar et al., "Controlled Growth of Well-Aligned Carbon Nanotubes, Electrochemical Modification and Electrodeposition of Multiple Shapes of Gold Nanostructures" Materials Sciences and Applications, 4, 667-678 (2013).
Lattanzi et al., "Geometry-Induced Mechanical Properties of Carbon Nanotube Foams", Advanced Engineering Materials, 15, No. 9999 (2014).
Tawfick, et al., "Mechanics of Capillary Forming of Aligned Carbon Nanotube Assemblies", American Chemical Society, pp. 1-13 (2013).
Joshi et al., "Patterned Growth of Ultra Long Carbon Nanotubes. Properties and Systematic Investigation into their Growth Process", J. Mater. Chem, 20, pp. 1717-1721 (2010).

* cited by examiner

DEVICE AND METHOD OF MANUFACTURING HIGH ASPECT RATIO STRUCTURES

FIELD

The present invention relates to a method of manufacturing high aspect ratio structures. The invention further relates to high aspect ratio structures manufactured by the method in particular, to an electronic device comprising an electronic circuit equipped with a current collector of a type such as electrochemical or electro-optical devices.

BACKGROUND

In electronic devices electronic circuits may be equipped with current collectors of a type such as in electrochemical or electro-optical devices. For example an electrochemical device is a battery such as a rechargeable Li-ion solid-state battery having current collector of non-planar design. Another example of an electro-optical device is a light collector wherein current from a photovoltaic reaction is collected in a 3D electrode. Batteries are electrochemical cells which store and supply electrical energy as a product of a chemical reaction or conversely, light is generated.

Thin-film battery structures of known type are disclosed e.g. in WO2010032159, the contents of which are included by reference, wherein for example all-solid state compositions are deposited on 3D micro-patterned structures. In this respect, where early battery structures utilize liquid electrolytes, all-solid state compositions utilize electrolytes of a solid state type, which are inherently safer in use. In these structures a large variety of materials are and have been used for the respective electrodes for example as disclosed in US 20110117417. In discharging battery mode, the anode is the "negative electrode" to which the positive current flows, from the cathode, being the "positive electrode". During charge these functions are reversed. Irrespective charging mode, the electrochemical relationship may be characterized by charge exchange between a negative electrode material and a positive electrode material, the negative electrode material having a workfunction or redox potential that is lower than the workfunction or redox potential of the positive electrode material.

For example, known negative electrode (anode) materials are $Li_4Ti_5O_{12}$ (Titanate); $LiC_6$ (Graphite); $Li4.4$ Si (Silicon) and $Li4.4Ge$ (Germanium) known positive electrode (cathode) materials are $LiCOO_2$ (LCO), $LiCoPO_4$, (doped) $LiMn_2O_4$ (LMO), $LiMnPO_4$, $LiFePO_4$ (LFP), $LiFePO_4F$ (LFPF) or $LiCO1/3Ni1/3Mn1/3O_2$ (LCNMO).

Known (solid state) electrolytes might include lithium iodide (LiI), lithium phosphate ($Li_3PO_4$) and lithium phosphorus oxynitride (LiPON). In addition, lithium salts, such as $LiPF_6$, $LiBF_4$ or $LiClO_4$ in an organic solvent, such as ethylene carbonate, dimethyl carbonate, diethyl carbonate, propylene carbonate are known to have a typical conductivity of about 10 mS/cm at RT. The electrolyte decomposes on initial charging and forms a solid layer called the solid electrolyte interphase (SEI).

Solid polymer separators may also be included, such polymers having transport capacity often due to having a lithium salt disposed therein as known in the state of the art. Work has also been performed with lithium and halide materials, particularly, in some examples, a lithium aluminum tetrahalide such as lithium aluminum tetrafluoride (LiAlF4).

Similarly, in a photovoltaic device, a conformal functional coating may be provided on the current collector, that aids in conversion of light to electric power or vice versa.

In the referenced type, a high specific surface area of current collector structures i.e. electrodes enable high currents to be drawn from these batteries. Moreover, they also will enable quick charging of these batteries. In the known device high aspect ratio structures such as pillars, trenches or holes are etched in a silicon wafer. In order to make the fabrication of these batteries cost-effective, a desire exists to produce these on cheaper substrates (e.g. metal/plastic foils) with a cheaper large-area process.

Once such structures are made on a bendable metal foil, they can be manufactured in large-scale processes, e.g. a roll-to-roll process where the following can be done: 1) Coiling, winding or stacking it to increase the energy or power density per unit volume. 2) Integrating it on flexible devices like flexible displays, signage etc.

Although, high-aspect ratio structures can be made in nanometer scale the height or depth of these high-aspect ratio structures need to be in the microns range for delivering enough charge capacity for the battery. The reason pillar structures are preferred is due to the easy accessibility of their entire surface when compared to porous or perforated structures of similar aspect ratio and dimensions. In the prior art many methods to produce these are non-economical (e.g. involving silicon microfabrication and long-time electrode-position). Moreover, to do any of these, the design of the stack is in need for optimization because otherwise while winding or flexing, the pillar structure could be damaged inhibiting proper electrochemical action of the device. From the prior art it is known to produce carbon nanotube structures on a substrate, e.g. of stainless steel, which is suggested as a 3D structure for electrodes. However, the structures suffer from a variety of problems. The nanotubes structures, while promising as template structure have problems, in that seeding is necessary in order to properly grow the structures. From "Electrodeposition of Metals onto Aligned Carbon Nanotube Microstructures", M. Diasio, 2011 NNIN Research Accomplishments, p 190, 191 a patterning technique is described wherein patterned CNT structures are produced by thermal chemical vapour deposition on iron catalyst over an aluminium oxide layer. While carbon is a good conductor, the seeding layer prevents good electrical conduction. Furthermore, when coating the pillar structure with a metal coating there exists a problem in providing substantially homogenously coated pillar structures, to render these suitable for the application as a current collector for electrochemical or electro-optical devices. Thus, it is not evident how to suitably create the pillar structures from carbon nanotubes (CNT).

A need still exists to produce these high aspect ratio structures in a simple and reliable way.

SUMMARY OF THE INVENTION

It is an object of the invention to provide a method for producing an electronic device having a current collector capable of a high specific charge collecting area and power of CNT material, having a proper dimensioning but is also achieved using a simple and fast technique and resulting in a robust design that may optionally be flexed.

To this end, according to an aspect a method is provided for manufacturing a current collector with a high-aspect ratio structure of pillars formed in a metal substrate, wherein the method comprises: form elongate and aligned carbon nanotube structures on a face thereof by masking a seed layer (e.g. Fe, Co, Ni etc.) on the metal face with a micro-pattern mask arranged to forming carbon nanotube pillars having a minimum interdistance larger than 600 nm; and rendering the pillars electrically conductive by a activation step; an electroless plating step and an electroplating step. In particular, the electronic device manufactured in this way comprising an electronic circuit equipped with a current collector formed by a metal substrate having a face forming a high-aspect ratio structure of pillars having a minimum interdistance that is larger than 600 nm. By forming the high-aspect carbon nanotube structure on a metal substrate, new structures can be formed that are conformal to curvature of a macroform or that can be coiled or wound or stacked and have a robust design. Accordingly a solution is proposed for closely packed structures on metal/plastic foils.

Throughout the application, the term "high aspect ratio structure" signifies a 3D structure on a substrate having pillars upstanding from a base that is coplanar with a substrate surface, i.e. embedded or outstanding from a substrate's face, the pillars more particularly within 20 degrees relative to normal to the substrate surface and having a height dimension, separated by a base having an interdistance between adjacent pillars, i.e. a length dimension normal to the walls coplanar along the base, wherein the ratio of the height dimension and the length dimension is relatively high, that is, higher than 50, or even higher than 80 or even more than 100. In a typical arrangement, the pillars may have height dimensions, i.e. a height separating a base plane from a planar surface of about 25-200 micrometer, preferably 50-100 micrometer wherein the length dimensions, i.e. the length separating opposing pillars, according to the independent claim has a minimum interdistance larger than 600 nm, and can be in the order of 1-10 micrometer, preferably 2-4 micrometer. For such structures, the substrate as presently disclosed is electrically conductive with a surface area of the current collector that is significantly increased, which enhances the charge collecting capacity of the current collector. Moreover, for such structures, it is possible to apply a conformal multilayer coating without compromising the functionality of the multilayer coating. Examples of such functionality may be multilayers such as a battery multilayer or photovoltaic multilayer or single layer coatings.

In addition, according to an aspect of the invention, for such high-aspect ratio structures optimal current collecting performance may be provided in the form of a homogenously coated carbon pillar metal substrate coated by a Ni/Pd coating, and wherein the high-aspect ratio structure comprises metal pillars having a radius of curvature larger than 50 nanometer. An aspect of improved performance is a trade-off that is found by a density of the high-aspect ratio structure demanding smaller pitches and the surrounding conformal coating. In this respect, electrode thicknesses in the battery multilayer may be varied and are correlated to match their volumetric storage capacities for Lithium-ions while charging and/or discharging. A known matching relationship is governed by a C-rate number, known in the art. A C-rate is a measure of the rate at which a battery is discharged relative to its maximum capacity. For example the capacity of the electrode layers at a certain C-rate are matched by controlling layer thickness and material composition. A further aspect of these structures is that for a charge collector having a conformal coating, for instance, a battery multilayer or PV multilayer, a minimum gap of e.g. 50 nm can be still be provided between homogenously coated high aspect ratio structures. The gap may be filled with a filler material for instance of a conductive nature (metal, e.g. copper, conductive glue) for example provided by a deposition process (ECD, PVD, CVD).

The filler could be conductive thus helping in current collection can also have adhesive property, which helps in stacking and could be a barrier material to protect the stack against water or oxygen.

Another aspect of the invention is that a 'conformal coating' is a coating that may comprise a plurality of layers that at least conformally coat the pillars of the high aspect ratio structure.

It is noted that in US2009214956 a structure is proposed wherein electrolyte material, is conformal coated onto conducting nanowires and wherein cathode material, in electrical connection with a second conductive material, is interpenetrated between electrolyte-coated nanowires. In contrast, the conformal coating of the present disclosure concerns, inter alia, a conformal multilayer including an electrolyte and providing a minimum gap between adjacent multilayers. In the specification, depending on context, functional layers may not be in direct contact with other functional structures, but may have intermediate layers or structures in between that may enhance functionality. In that respect, the skilled person will understand that where it is described, for example, that the negative electrode layer is 'in contact' with a charge collector, such would be interpreted as 'in electrical contact' not excluding a possible Lithium diffusion barrier layer, current collecting layer, process protection layer etc. enhancing functionality. This similarly counts for electrolyte layers 'in contact' with the negative electrode and positive electrode layers.

The inventors furthermore surprisingly found, for the structures of interest, that a radius of curvature of the high aspect ratio structures is larger than 200 nanometer to improve the conformal layer quality.

According to another aspect of the invention metallized pillars may be formed in high aspect ratio clusters that are separated by a grid of planar zones. Such structures enhance flexibility and robustness of the high aspect ratio clusters, which may be substantially planar, while the grid provides a degree of freedom for conformality to macro forms such as casings of automobiles, mobile telephones etc. that are non planar.

These and other aspects of the invention will be discussed in more detail with reference to drawings, wherein like reference numerals refer to like elements. It will be appreciated that the drawings are presented for illustrative purposes and may not be used for limiting the scope of the appended claims.

DETAILED DESCRIPTION OF THE DRAWINGS

Figure 1:
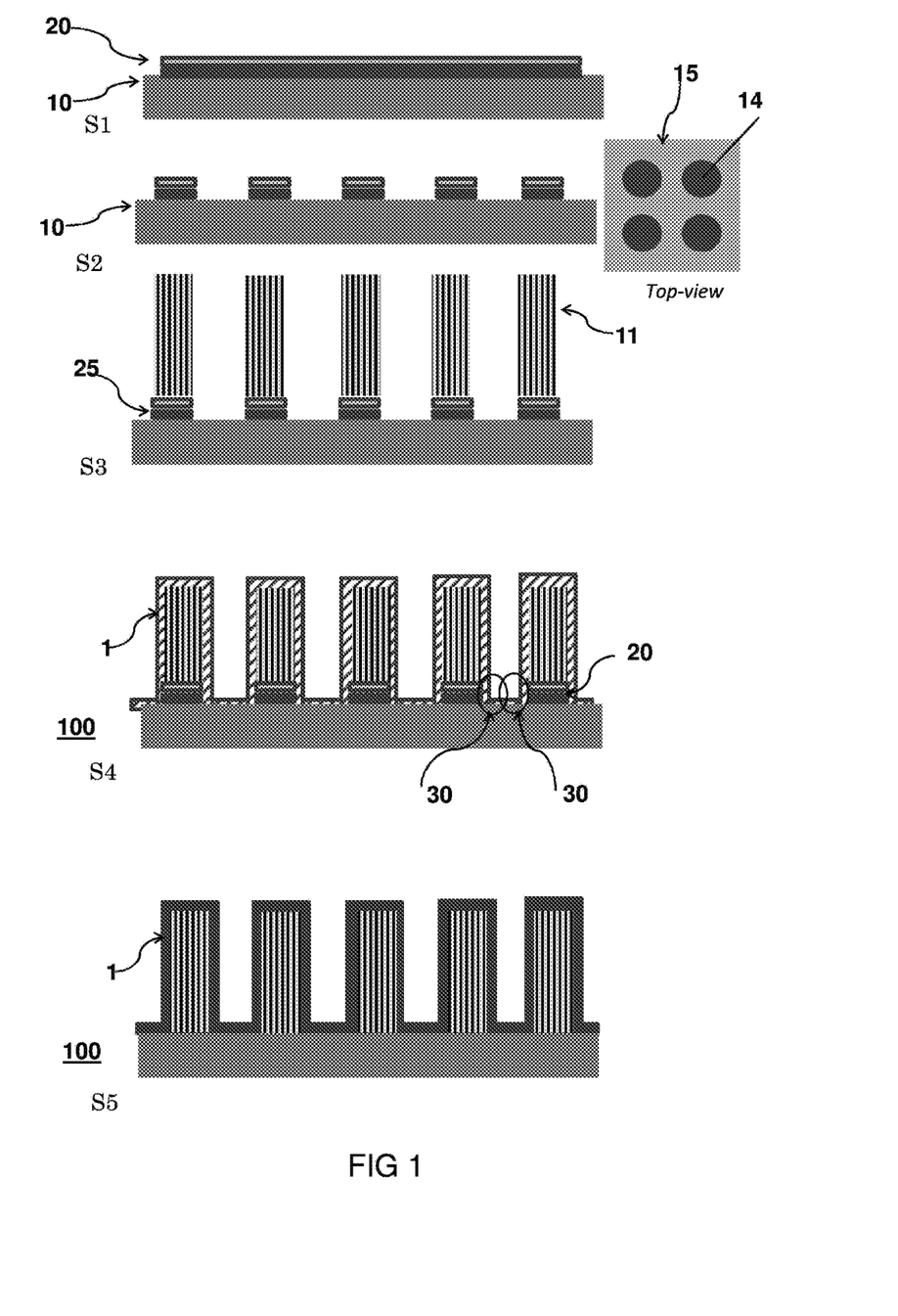
FIG. 1 shows subsequent steps according to a first embodiment.

In FIG. 1 a first embodiment is illustrated of a method according to the present invention. More in particular, in a first step S1, by a seed layer 25 comprising an iron catalyst over an aluminium oxide layer self-aligned carbon nanotubes 11 are formed on substrate 10, for example 100 μm high, with a diameter of 80 nm. The seed layer is per se known, and typically comprises an $AlO_x$/Fe component that can form a catalyst seed for the nanotube. The $Al_2O_3$ layer 25 functions as a buffer layer.

After providing the seed layer 25, its top surface may be covered with a patterned dots mask 15 (e.g. photoresist) having a hole pattern 14 with lateral dimensions of the final desired micropillars 11. A hole pattern 14 in a mask 15 creates isolated patterns of micropillars that can be formed as templates for a subsequent plating process.

Subsequently, in a second step S2 a photolithographic process is carried out in a resist with a microdots mask pattern 14 masking the seed layer 25 with a micro-pattern dots mask arranged to forming pillars 11. For instance, the dot diameter may be 2 μm and a pitch may be 4 μm, e.g., forming seed areas with a minimum interdistance between the walls of 2 μm or larger than 600 nm.

In a subsequent step S3 the CNTs are grown by a conventional deposition process on the seed pattern, i.e. the Fe component of the seed layer. The deposition process relies on a selective chemical vapor deposition process with a gaseous hydrocarbon source such as methane, ethylene, acetylene or benzene.

Next step S4 will render the pillars thus formed more electrically conductive by an electroless plating step as exemplified in the further embodiments. It is noted that while the CNT structure does exhibit electrical conductivity, this is insufficient to render these suitable for the application as an current collector for electrochemical or electro-optical devices; whereas this plating step solves the problem of providing a homogenously coated pillar structures.

Next in step S5 optionally, an additional metal coating may now be applied to render the walls even more conductive by electroplating for which step S3 forms a critical preparation step. In addition, the electroless plating step provides an electrical bridging layer 30 that shorts the barrier layer 20 in order to form a flow path in the electroplating step. It has been found, that by after the initial electroless plating step, sufficient conductivity is obtained preventing undesired current drop in the micropillars and a homogenous coating can be provided.

In the above mentioned processing methods,
the shape of the final micro pillars need not be round (could have any geometric cross-section) and a wide range of pitch as well as arrangement can be chosen.
it can be chosen to do the anodization process on both sides of the foil. Such a two sided anodization could result in balanced volume expansion stress caused during anodizing aluminium to porous alumina.

Figure 2:
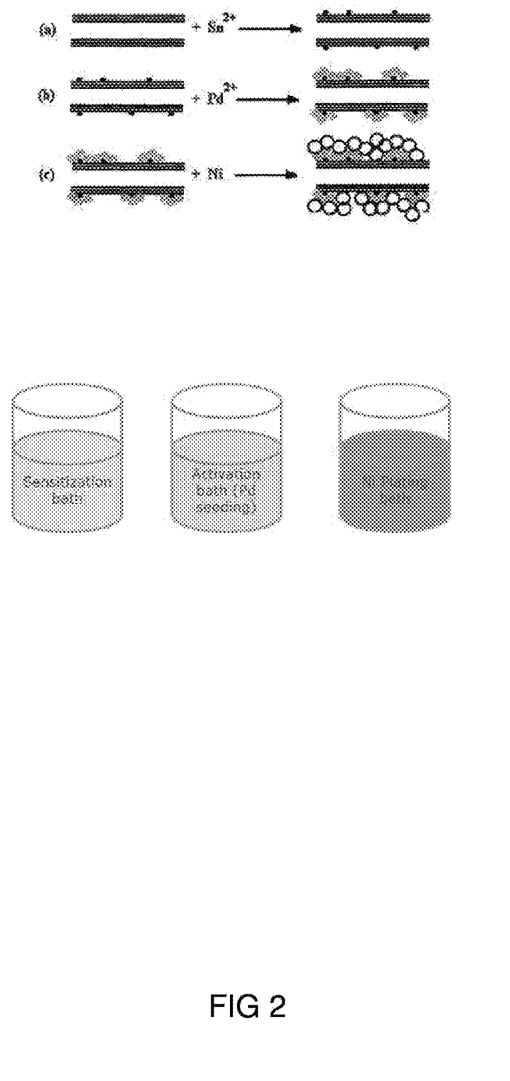
FIG. 2 shows in more detail a process of providing a metal coating onto CNTs.

In FIG. 2 in more detail a process is illustrated providing a metal coating onto CNT's. It is noted in particular providing a sufficiently homogenously coated electroless plated metal film onto the carbon nanotubes formed as micropillar structures is challenging because the structures can dissolve from the buffer layer into the process liquids quite fast. As well most literature works focused on metallization of CNTs do not provide an adequate solution.

From a process point of view CNTs are sensitized by an activation step, and a subsequent functionalization step. These steps can optionally be combined. The activation, i.e. formation of reactive groups on the surface induced by e.g. oxidation such as carboxylic groups can be used to support further functionalization.

One activation option may be being prolonged exposure to strong acids such as nitric acid or sulfuric acid (see Chemically Functionalized Carbon Nanotubes, K. Balasubramanian, M. Burghard, small 2005, 1, p 180). Alternatively other acids could be used such as $SnCl_2$ as described by (Qunqing Li et al.; Coating of Carbon Nanotube with Nickel using electroless plating method; Jpn. J. Appl. Phys. Vol. 36 (1997) pp. L 501-L 503.). The speed of reaction can be increased by performing the reaction at elevated temperatures as well as (ultrasonically) stirring the solution. This step requires the buffer layer to be insensitive to acids.

Otherwise, and preferably for a seed layer comprising an $AlO_x$/Fe component, a reactive plasma gas may be used e.g. $O_2$ or $NH_3$ (Radio-frequency plasma functionalization of carbon nanotubes surface $O_2$, $NH_3$, and $CF_4$ treatments, e.g. by 0.5-5 min plasma treatment by a 100-1000 W oxygen plasma. A. Felten, C. Bittencourt, J. J. Pireaux, G. Van Lier and J. C. Charlier. J. Appl. Phys. 98, 074308, 2005) as well as ozone treatments (Room temperature functionalization of carbon nanotubes using an ozone/water vapor mixture. Ke Penga, Lu-Qi Liva, Hongchao Lic, Helmut Meyerc, Zhong Zhang, Carbon, 49, 2011, p 70). It is found that by dry activation treatment, the CNT-buffer layer structure remained intact.

After the activation step, a functionalizing step (b) may be carried out for supplying the carbon nanotubes with suitable catalyst. Typical catalyst needed to provide electroless plating consist of Pd, Sn, Au or Pt ions or nanoparticles. In one example, a suitable plasma, such as NH3 plasma, may provide a combined activation/functionalization process for sensitizing the CNTs.

An other sensitation process may be carried out by bathing the CNT structures in a solution of $SnCl_2$ at 45° C. for 30 min. The active CNTs can then functionalized in 0.006 mol/L PdCl2 solution at 45° C. for 30 min and dried at 110° C. before electroless plating, as e.g. described by Li et al. The resulting reaction provides a layer of reduced palladium ions on the surface, needed to initiate the electroless plating. Alternatively a procedure given by Li-Ming Ang et al can be used (Electroless Plating of Metals onto Carbon Nanotubes Activated by a Single-Step Activation Method, Li-Ming Ang et al, Chem. Mater. 1999, 11, 2115). Here Tin and palladium ions are introduced onto the oxidized CNTs from a PdCl2/SnCl2 colloidal solution. A 1 M HCl solution was used improve the catalytic Pd—Sn operation.

Alternatively functionalizing step b1 could be performed by providing a termination group for binding a seed metal such as a Pd, Sn, Au in a chloride, acetate salt. Rather than performing a single reaction, CNTs e.g. activated by oxidation or by $NH_3$ plasma can be taken as a starting point. In case the surface is not sufficiently active by itself, the process may be enhanced by selectively terminating the surface with suitable terminations such as thiols or amines. Such terminations can be achieved onto CNTs through the usage of linkage groups such as dithiols (e.g. ethanedithiol, hexanedithiol), or diamines (e.g. ethanedithiol, hexanediamine) and solutions thereof, e.g. 1M hexanediamine in ethanol.

By submerging the CNTs into a solution of which contains a Pd, Sn, Au salt such as a chloride, acetate salt binding step b2 is carried out. The process steps are preferably carried out in a pH neutral bath, with acidity above 3 pH, e.g. 0.01-0.5 g dm-3 of PdCl2 in $H_2O$ for e.g. 5-20 min. Alternatively nanoparticles could be used (New formation process of plating thin films on several substrates by means of self-assembled monolayer (SAM) process, T. Osaka, M.

Yoshino, Electrochimica Acta 53, 2007 271, Formation of electroless barrier and seed layers in a high aspect ratio through-Si vias using Au nanoparticle catalyst for all-wet Cu filling technology, Fumihiro Inouea, Tomohiro Shimizua, et al. Electrochimica Acta 56, 2011, 6245, Comparative Study of Electroless Copper Film on Different Self-Assembled Monolayers Modified ABS Substrate, Jiushuai Xu et al Int. J. Mol. Sci. 2014, 15, 6412-6422, Fabrication and Catalytic Properties of Palladium Nanoparticles Deposited on a Silanized Asymmetric Ceramic Support, Rizhi Chen et al. Ind. Eng. Chem. Res. 2011, 50, 4405). After the submersion a thin uniform layer of ions or nanoparticles remain onto the CNTs. This can be used as a seed for a subsequent electroless plating step (c).

In a next step (c), the sensitized carbon nanotubes are introduced into an electroless Nickel plating bath, e.g. with a $NiCl_2$, $NiSO_4$ solution. The procedure is carried out at 75° C. and the metal coated carbon nanotubes are washed with distilled water.

Still more advantageously, the electroless plating step (c) bridges the buffer layer with a homogenously provided porous layer formed by electroless plating. A porous Ni layer may be defined in terms of poresize distribution or void-fraction. The average pore diameter can be measured by gas diffusion techniques (for nanopores of 5-20 nm). Another technique like bubble porosimetry can be used for slightly larger pores (30-100 nm). The control of the poresize may be done by controlling the amount of activation and/or Pd-seeding and/or Ni plating on the CNTs, in order to avoid a closed or non-porous layer. The porosity is tuned for optimization of subsequent process steps for manufacturing a battery layer, to prevent bursting of the plated micropillar structures. Additionally, the adequacy of the porosity of the plated layer can be even verified by a potentially destructive test of heating the plated pillars in an oven (at temperatures >20 C up to 700 C). If the pillars burst open during this test, then the inadequacy of the porosity to release all the gases could be concluded.

Figure 3:
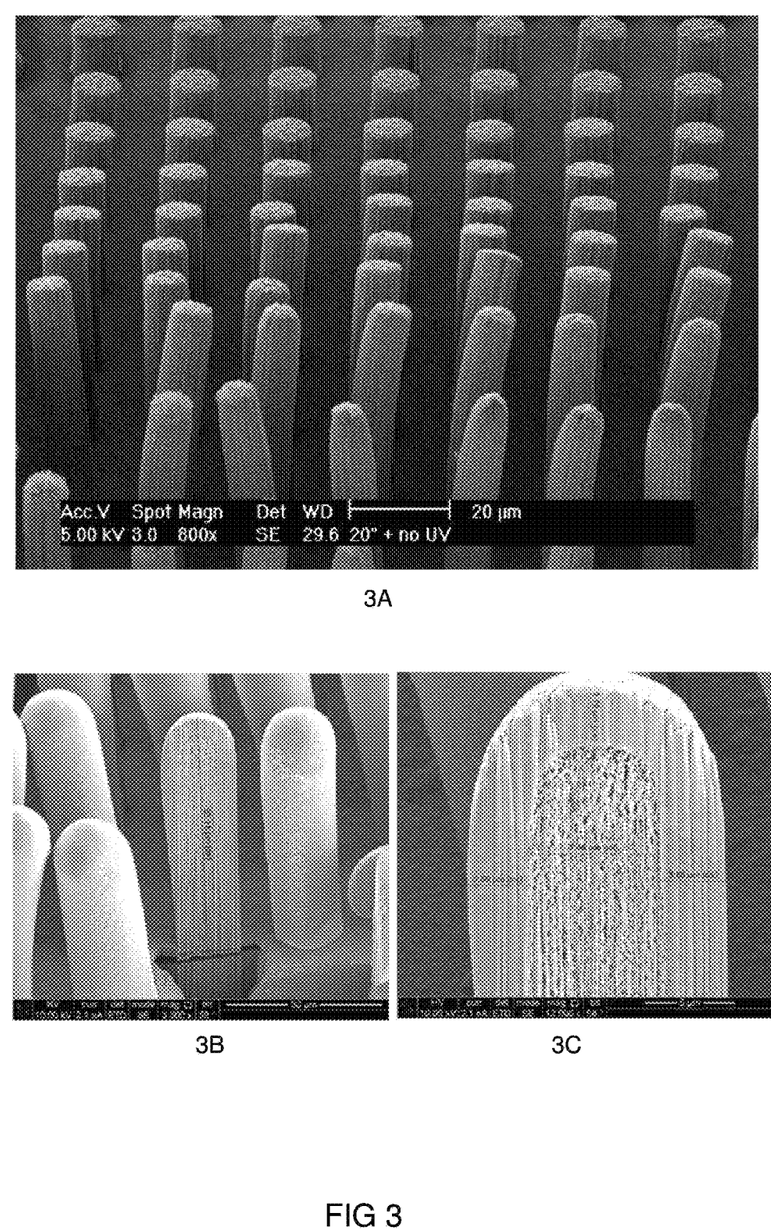
FIGS. 3A, 3B and 3C respectively show micrographs of CNT tube structures.

Results are shown in FIG. 3, where in FIG. 3A a grid of homogenously coated CNT micropillar array is shown, with a pitch of approximately 20 micrometer. In FIGS. 3B and 3C respectively sectional micrographs of a CNT tube are shown, after the electroplating step. Clearly homogenous forms are provided of densily coated carbon nanotubes with a plating of about 3.5 micrometer and a nanotube diameter of about 7.5 micrometer. The heights of the pillars are approximately 65 micrometer. It will be clear to the skilled that the illustrated values are exemplary values, and not to be restricted to these dimensions, but many differing dimensions and thicknesses can be reliably produced in this way.

While in the following the current collector structures are illustrated in isolated form, the skilled person will understand that they will form integral elements of an electronic device designed to a specific purpose. For example, charge collecting is an essential part of a battery structure or electro-optical devices, for example, a solar cell. For example, in an embodiment of the invention an electronic device having an high-aspect ratio structure can be covered with PhotoVoltaic (PV) multilayers yielding a higher area efficiency of the PV. For example, in another embodiment, the electronic device may have PV multilayers that are deposited on the high-aspect ratio structure already coated with battery multilayers. In another example, the electronic device may have PV multilayers that are deposited on the high-aspect ratio structure which are formed on the opposite face of the substrate already containing battery multilayers. This is an interesting concept that provides a photovoltaic foil device including a battery function, that share a common electrode in the form of the high aspect ratio structure as presently disclosed.

In their simplest conceptualization, battery devices two electrodes, one that supplies electrons by virtue of an oxidation process occurring at that electrode, termed the anode, and a second one that consumes electrons by virtue of a reduction process occurring at that electrode, termed the cathode. In discharging battery mode, the anode is the "negative electrode" to which the positive current flows, from the cathode, being the "positive electrode". During charge these functions are reversed. Irrespective charging mode, the electrochemical relationship may be characterized by charge exchange between a negative electrode material and a positive electrode material, the negative electrode material having a workfunction or redox potential that is lower than the workfunction or redox potential of the positive electrode material.

For example, known negative electrode (anode during battery discharge) materials are $Li_4Ti_5O_{12}$ (Lithium Titanate spinel or LTO); $LiC_6$ (Graphite); $Li4.4$ Si (Silicon) and $Li4.4Ge$ (Germanium) known positive electrode (cathode) materials are $LiCoO_2$ (Lithium Cobalt oxide or LCO), $LiCoPO_4$, (doped) $LiMn_2O_4$ (Lithium manganese oxide spinel or LMO), $LiMnPO_4$, $LiFePO_4$ (LFP), $LiFePO_4F$ (LFPF) or $LiCO1/3Ni1/3Mn1/3O2$ (LCNMO).

Known (solid state) electrolytes might include lithium iodide (LiI), lithium phosphate ($Li_3PO_4$) and lithium phosphorus oxynitride (LiPON). In addition, lithium salts, such as $LiPF_6$, $LiBF_4$ or $LiClO_4$ in an organic solvent, such as ethylene carbonate, dimethyl carbonate, diethyl carbonate, propylene carbonate are known to have a typical conductivity of about 10 mS/cm at RT. The electrolyte decomposes on initial charging and forms a solid layer called the solid electrolyte interphase (SEI).

Thin film ion batteries, including those of the thin film solid state lithium ion type, can be prepared from various deposition techniques to fabricate negative electrode, positive electrode, and electrolyte materials bonded together to form the battery. Such techniques may typically include depositing thin films of such materials using vacuum deposition or other techniques that result in similar thin films, to produce the "thin film" batteries. Thin film batteries are often employed in applications in which space and weight may preferably be conserved and extremely long cycle life may be desired.

In the following examples in more detail aspects of the invention will be illustrated in the form of an electrochemical device, more specifically a battery device, for instance of a lithium ion type, more specifically having a 3D collector structure for enhancing the charge collecting specific area of the collector, that is in electrical contact with battery multilayer, in particular, a negative electrode layer thereof.

Figure 4:
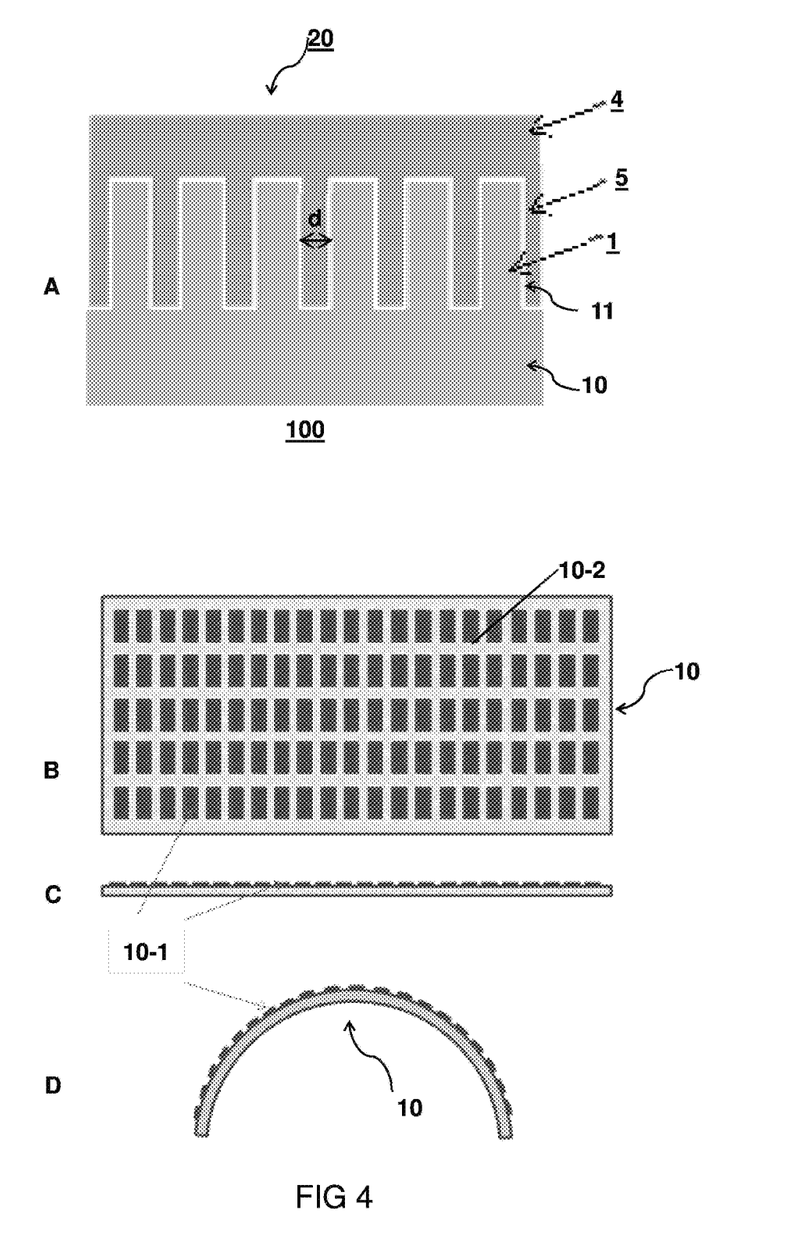
FIG. 4 (A-D) schematically shows a high aspect ratio structure according an embodiment of the present invention FIG. 5 (A-B) illustrates aspects of high aspect ratio structures that are wound or stacked

FIG. 4 schematically shows a high aspect ratio structure according to an embodiment of the present invention. In the figure, a high aspect ratio structure 1 is formed from the coated carbon nanotube pillar structures 11 as hereabove disclosed in detail. The electronic device 100 comprising an electronic circuit equipped with a current collector 10 formed by a metal substrate foil 10 having a face forming a high-aspect ratio structure 1 of pillars 11. The walls have an interdistance d larger than 600 nm and, for example, an aspect ratio larger than 10 or even larger than 50. The carbon nanotubes can be formed by a micropattern mask 15, so that isolated carbon nanotube micro pillars 11 are formed. In the specification, the term pillars or micropillars is used to distinguish from 'dense' nanotube structures, which have elongate tubes having diameter dimensions smaller than 300, or even smaller than 50 or 10 nm and with interdistances d smaller than about several hundreds nm, e.g. in the range of 50-300 nm, which are too densely packed without sufficient gap for conformally coating multilayer stacks on them.

The pillars 11 may have lengths of more than 100 nm, arbitrary elongate shapes and diameters at least larger than the said 10 nm, typically more than 100 nm and in this respect typically qualify as high aspect ratio structures.

In US2009214956, a structure is proposed wherein electrolyte material is conformally coated onto conducting nanowires and wherein cathode material, in electrical connection with a second conductive material, is interpenetrated between electrolyte-coated nanowires. In contrast, the micropillars 11 as presently discloses have interdistances substantially larger, that is larger than 600 nm. The pillars 11 are covered by a multilayer or stack 5 of a suitable composition, further detailed below. Suitably, the collector is planarized by a filling spacer material 4, for example, a conductive glue, or a plated material that is in electrical contact with a cathode of the multilayer to form opposite electrode 20. The compressibility as well as strechability of each of the layers in the device 100, the adhesion between the layers 10, 5 and 20 and the total bending stiffness of the stack will determine the maximum allowed bending radius (without damage) while winding or flexing.

The filling spacer material 4 could be any organic or inorganic material. It can for example have some other extra functionality such as a current collector and may optionally, be electroplated over the pillars after the active layers of the battery stack are deposited. Also, the filling can be used as a planarizing filler that planarizes the high-aspect ratio structure 1.

FIGS. 4B, C and D in more detail show a top view, side view and flexed view of clustered pillar forms 10-1 to illustrate how the substrate foil 10 of the current collector can be wound or flexed. In order to enable easy flexing, instead of having the pillars all over the substrate foil 10, isolated islands of pillar-clusters 10-1 can be patterned in a metal foil to form an integral part of it. The lower stiffness of the substrate foil 10 at locations with no pillars, i.e. a grid of planar zones 10-2, enables easy bending or rolling of a 3D battery foil formed from the substrate foil 10 for example, as illustrated in FIG. 4 D. The high aspect ratio clusters 10-1 of micropillars can optionally be further stabilized by filling a spacer material between them of the type disclosed in FIG. 4A. In an example, the high aspect ratio clusters may span an area smaller than 10 e4 micrometer2; and the planar zones may be are formed as strips having a width larger than 50 micrometer, although other ranges can be suitably used to the same effect of clustering to enable easy flexing.

Figure 5A:
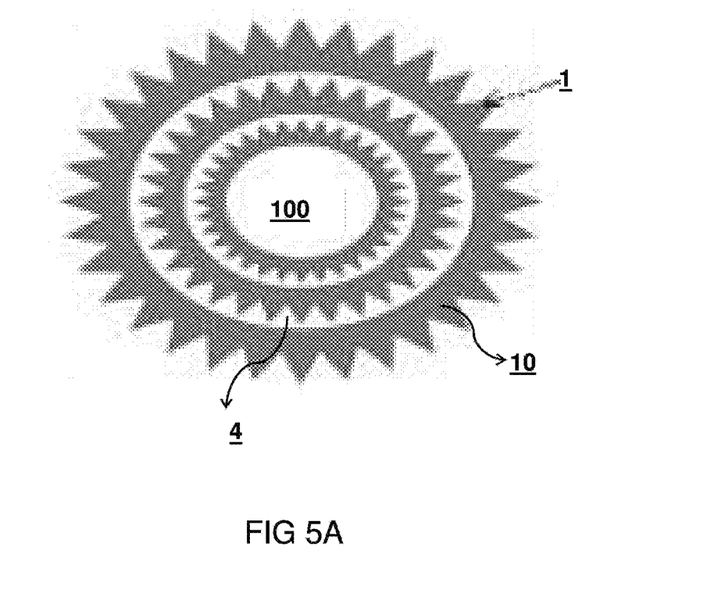
Figure 5B:
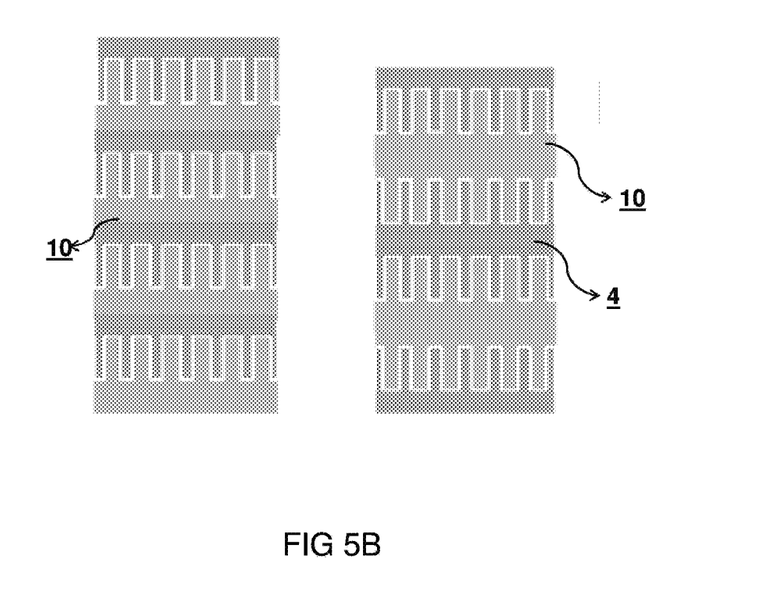

FIG. 5 illustrates how the high aspect ratio structures can be wound (FIG. 5A) or stacked (FIG. 5B). While winding, to avoid damage to the pillars, the pillars are made to face outwards so that the face forming the high-aspect structure is convex. The wound stack can either be concentric (as shown in the figure) or like a continuous spiral, in the figure, by tapered pillars, cones or pyramids facing outwards. In order to avoid cracking of the active layers due to strains caused while winding, optionally the deposition of (at least some of the) active layers can be done after the winding is done.

Since the possibility of cracking the active layers while bending or winding is the highest in-between the pillars, it can be optionally chosen to deposit the active layers just on the pillars (and not in-between). Moreover, this will additionally also avoid cracking at the base corners around the pillars while volume expansion/contraction of the electrode layers happens during charging/discharging of the battery.

In general, in order to avoid active layers cracking while flexing or while battery operation, corners of the 3D battery structure are to be designed rounder, i.e. with a radius of curvature larger than 200 nm, or even larger than 1 micrometer.

FIG. 5B shows another way of increasing the energy or power density per unit volume of the 3D battery, for example by stacking separate battery foils 10 on top of each other. This stacking in the 3D battery case can be done by using optionally a conductive glue 4 (if the foils are connected in series). This conductive glue 4 could also be a filler material to stabilize the pillars on each of the foils. Accordingly, a plurality of current collectors may be provided, that are alternatingly stacked with battery multilayers.

Optionally, 3D pillars could be created on both sides of the metal foil. In embodiment, this could be combined with a photovoltaic layer on one side and a battery layer on the other side or on the same side. In another embodiment this could be used to provide two battery stack layers per foil 10. In this case, the substrate foil (in case of being a metal), will act as a common electrode while stacked (see FIG. 5b). The connection of different battery foils to each other in a circuit needs to be according to the voltage desired while charging and discharging.

In order to make such batteries cost-effective, it is advantageous to transfer this technology to large area metal foils e.g. for roll-to-roll processing.

Figure 6:
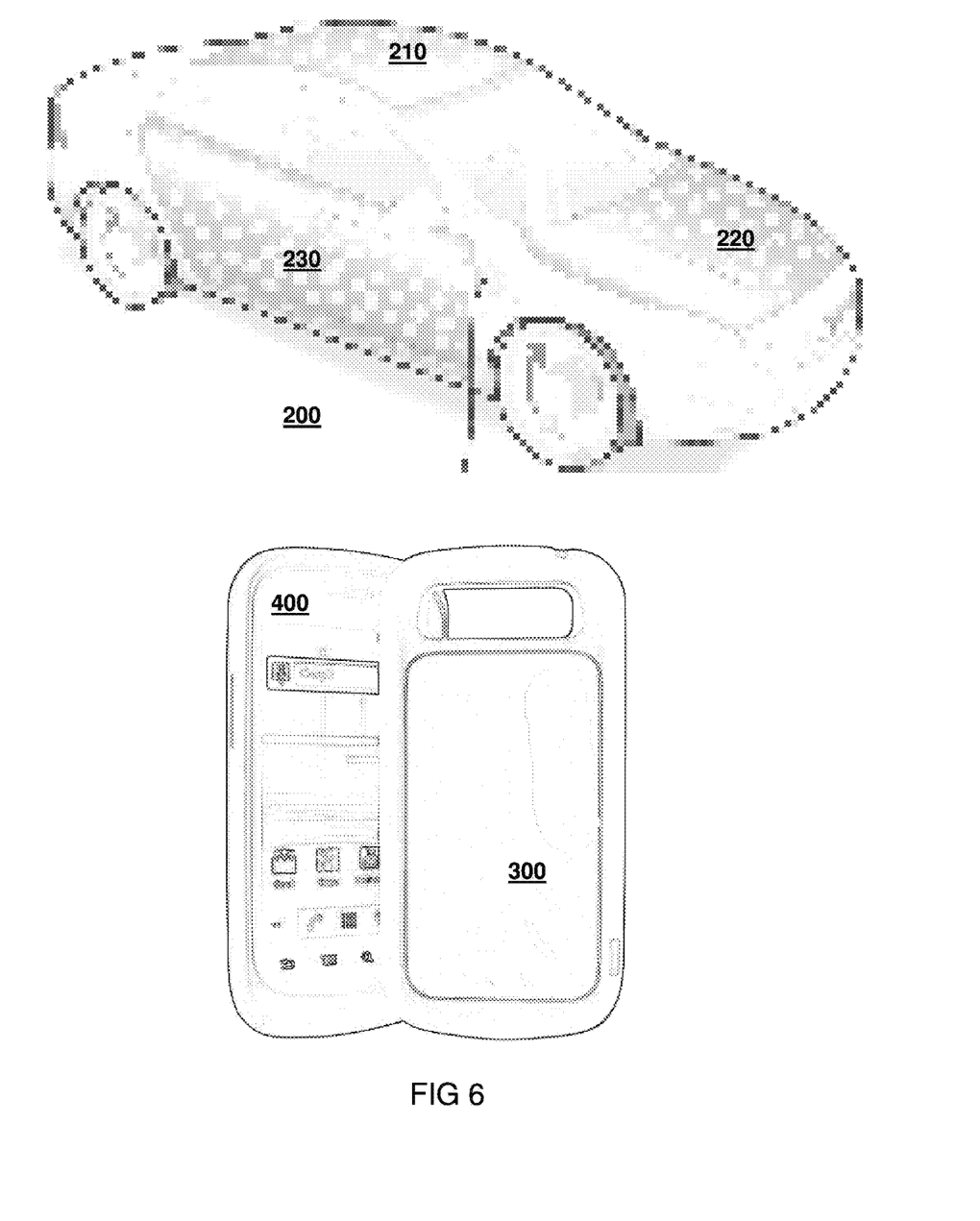
FIG. 6 shows examples of packaging or covers with the high aspect ratio structures

FIG. 6 shows examples of using packaging or covers or frames of devices/machines/equipments as substrates for 3D thin-film batteries. Nowadays, since products are getting compacter, the demand on small and more compact batteries (providing the same power or capacity needed) is growing. The ideas mentioned in this patent intake is about fabricating these 3D micropillar structures on the package or cover of a device that uses these batteries. One of the areas that has been looked into is the integration of batteries into the package/cover of a device. A device could be as small as a mobile phone 300 and as big as an electric car 200. For example in a car, aluminium or aluminized covers, such as a side panel 230, roof panel 210, bonnet 220 etc., may be used for providing battery structures on large areas. Or, in a mobile phone 400, an aluminized rear panel of the mobile phone 300 having the high aspect ratio structure as presently disclosed may be forming the battery, or may be provided as a switchable cover for extra power.

The 3D structured substrate could contain pillar structures or aligned porous structures achieved by anodization as the base technology.

For instance, since the 3D battery structures can be formed directly by anodizing the body frame of a car. The material of the frame can be of steel, coated with a layer of Aluminium needed for anodization. Subsequent electroplating and oxide etching steps can create the 3D pillar structures on the car body (preferably interior).

Accordingly the metal substrate having the high aspect ratio structure may monolithically formed as a casing structure. There are other devices that have covers made of aluminium, where this concept may be applied. Alternatively a metal substrate may be stacked on an organic foil, i.e. containing a hydrocarbon content, for example, PEN, PET etc. or plastic mould structure. Even if the packages/covers of most of the devices today are moulded of plastic, still 10 s of micrometers of aluminium can be electroless plated by ionic liquids on plastics to create the battery on it or in it.

Figure 7:
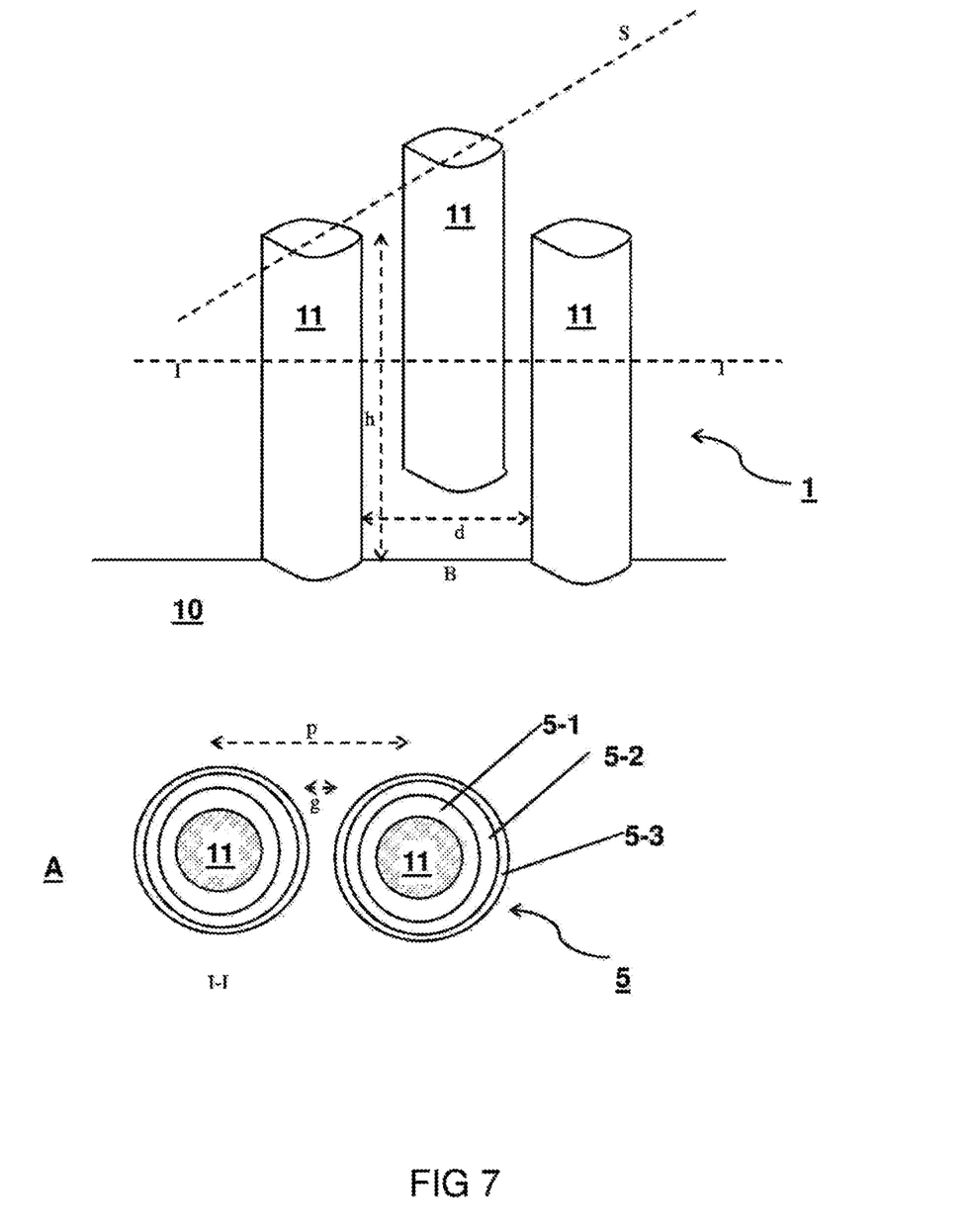
FIG. 7 shows an exemplary perspective schematic of a high aspect ratio structure in the form of pillars.

FIG. 7 shows an exemplary perspective schematic of a high aspect ratio structure 1 in the form of pillars 11 that are covered with a conformal battery multilayer as shown in the 4A, giving a schematic cross-sectional view along I-I. The high-aspect ratio structure 1 disclosed is formed by geometrically ordered micropillars 11 on a substrate foil 10 having a base b conformal with a surface s but can alternatively be trenches, ridges, tapered structures and forming a planar faces. In the embodiment, the metallized carbon nanotube pillars 11 have a radius of curvature larger than 50 nanometer. A minimum interdistance d is larger than 600 nm to accommodate a conformal coating of about 300 nm thickness. A practical interdistance may be about 2-3 micron. The metal pillars 11 may have a height h as high as 25 micrometer or higher, for example, 50 or 100 micrometer and can be formed with a pitch p in the range of 3-12 micrometer. Gaps g between pillars 11 are preferably filled, in particular, after depositing the active battery multilayer 5 of the battery stack with cushion or filling spacer material 4 to avoid contact between them while bending or flexing the 3D battery stack. A gap between adjacent conformal coatings of the battery multilayer 5 may be in the order of 100-500 nanometer. The gap may be completely filled with a conductive material.

In the example, preferably, the battery multilayer 5 comprises a solid state electrolyte layer 5-2 interposed between a negative electrode layer 5-1 in electrical contact with the pillar 11 and a positive electrode layer 5-3. It is found that the battery multilayer 5 preferably comprises a first electrode 5-1 layer coated on the high-aspect ratio structure and having a thickness that matches, for a given C-rate, the effective volumetric storage capacity of second electrode layer 5-3 that is separated from the first electrode layer by an electrolyte layer 5-2. In this way electrode thicknesses in the battery multilayer may be varied and are correlated to match their effective volumetric storage for a given C-rate capacities for Lithium-ions while charging and/or discharging, while at the same time, due to curvature, the manufacturability is enhanced. The thickness of the negative electrode layer can be typically less than the positive electrode layer due to a higher theoretical density. For LixTiO2 and or LixMnO2 the densities and thicknesses are similar. For example, the first layer 5-1 may be the negative electrode layer ranging between 80 and 300 nm; and the second layer 5-2 may be an electrolyte layer ranging between 60 and 200 nm. The positive electrode layer, 5-3 may range between 30 and 200 nm. The battery stack could be integrated into any other device (e.g. PV) substrate, which can then be further integrated into other structures.

Instead of a battery layer that is formed conformally to the high aspect ratio structure, such structure may be used as a charge collector structure when combined with a negative electrode layer that is formed to planarize the high aspect structure—i.e. not a conformal layer. For instance such negative electrode layer could be in contact with an electrolyte of solid state type but alternatively could be in a liquid form.

Aspects of the present invention are characterized by the following clauses:

A method of manufacturing a current collector with a high-aspect ratio structure of pillars formed on a metal substrate, wherein the method comprises: forming elongate and aligned carbon nanotube structures on a face of a seed layer covering the metal substrate; with a micro-pattern mask arranged to forming the carbon nanotube pillars having a minimum interdistance larger than 600 nm; and a rendering step to render the pillars electrically conductive by sensitizing the carbon nano tube pillars with a seed metal; electroless plating the sensitized carbon nano tubes to bridge the seed layer and an electroplating step so that the carbon nanotube pillars are rendered electrically conductive by covering the pillar walls with a conductive layer.

An electronic device comprising an electronic circuit equipped with a current collector formed by a metal substrate having face forming a high-aspect ratio structure of pillars, the walls having a minimum interdistance larger than 600 nm said carbon nanotube pillars being electrically conductive.

An electronic device as before, wherein the high-aspect ratio structure is formed by trenches or geometrically ordered micropillars.

An electronic device as before, wherein the high-aspect ratio structure comprises pillars having a radius of curvature larger than 50 nanometer.

An electronic device as before, wherein the pillars are higher than 25 micrometer.

An electronic device as before, wherein the pillars are formed in high aspect ratio clusters that are separated by a grid of planar zones.

An electronic device as before, wherein the high aspect ratio clusters span an area smaller than 10 e4 micrometer2; and wherein the planar zones are formed as strips having a width larger than 50 micrometer.

An electronic device as before, wherein the face forming the high-aspect structure is convex.

An electronic device as before, wherein the substrate is a foil having both faces forming a high-aspect ratio structure.

An electronic device as before, wherein the high-aspect ratio structure and the metal substrate are formed monolithically.

An electronic device as before, wherein the high aspect ratio structure is covered with a coating that is conformal to the pillars of the high aspect ratio structure.

An electronic device as before, wherein the coating is a battery multilayer or a PV multilayer or both.

An electronic device as before, wherein the battery multilayer comprises a solid state electrolyte layer.

An electronic device as before, wherein the battery multilayer comprises a first electrode layer coated on the high-aspect ratio structure and having a thickness that matches the effective volumetric storage capacity of a second electrode layer at a battery charging rate larger than 10 C-rate.

An electronic device as before, wherein the first layer is an negative electrode layer ranging between 80 and 300 nm; wherein the second layer is an electrolyte layer ranging between 60 and 200 nm; and wherein a positive electrode layer ranges between 30 and 200 nm.

An electronic device as before, having a plurality of current collectors, that are alternatingly stacked.

An electronic device as before, wherein the multilayer structure is covered with a planarizing filler that planarizes the high-aspect structure.

An electronic device as before, wherein the filler is a metal forming an electrode part.

An electronic device as before, wherein the filler is a conductive glue that functions to stack the current collector and while stabilizing the high aspect structure.

An electronic device as before, wherein the metal substrate is stacked on an organic foil.

An electronic device as before, wherein the metal substrate is monolithically formed as a casing structure. The claimed battery stack could be integrated into any other device (e.g. PV) substrate, which can then be further integrated into other structures.

It will be appreciated that while specific embodiments of the invention have been described above, that the invention may be practiced otherwise than as described. In addition, isolated features discussed with reference to different figures may be combined.

The invention claimed is:

1. A method of manufacturing a 3D thin film current collector with a high-aspect ratio structure of pillars formed on a metal substrate, wherein the method comprises:
   forming elongate and aligned carbon nanotube pillars on a face of a seed layer covering the metal substrate with a micro-pattern mask, the micro-pattern mask arranging the carbon nanotube pillars to have a minimum interdistance in a range between 600 nm and 10 μm;
   sensitizing the carbon nanotube pillars with a seed metal;
   electroless plating the sensitized carbon nanotube pillars to electrically bridge the carbon nanotube pillars across the seed layer to the metal substrate by a plated electroconductive material deposited by said electroless plating step, said plated electroconductive material electrically connecting said metal substrate to said sensitized carbon nanotube pillars to form a sensitized carbon nanotube structure of pillars;
   covering the sensitized carbon nanotube structure of pillars with a conductive layer deposited by an electroplating step; and
   conformally covering the conductive layer with subsequent layers of a coating that is a battery multilayer or a photovoltaic multilayer, wherein the subsequent layers comprise a solid state electrolyte layer.

2. The method according to claim 1, wherein the sensitizing step is carried out using a solution having a pH >3.

3. The method according to claim 1, wherein the conductive layer is porous.

4. The method according to claim 1, further comprising covering the subsequent layers of the coating on the conductive layer with a planarizing filler.

5. The method according to claim 1, wherein the metal substrate is stacked on an organic foil.

6. The method according to claim 1, wherein the steps of forming, sensitizing, electroless plating and covering are carried out in a roll-to-roll process.

* * * * *